(12) United States Patent (10) Patent No.: US 8,326,486 B2
Moinzadeh et al. (45) Date of Patent: *Dec. 4, 2012

(54) CENTRALIZED MANAGEMENT OF MOTOR VEHICLE SOFTWARE APPLICATIONS AND SERVICES

(75) Inventors: Kamyar Moinzadeh, Bellevue, WA (US); Leon L. Hong, Sammamish, WA (US); Lee Zhao, Sammamish, WA (US)

(73) Assignee: Airbiquity Inc., Seattle, WA (US)

( * ) Notice: Subject to any disclaimer, the term of this patent is extended or adjusted under 35 U.S.C. 154(b) by 23 days.

This patent is subject to a terminal disclaimer.

(21) Appl. No.: 12/886,466

(22) Filed: Sep. 20, 2010

(65) Prior Publication Data

US 2011/0093135 A1 Apr. 21, 2011

Related U.S. Application Data

(63) Continuation of application No. 12/777,989, filed on May 11, 2010, which is a continuation-in-part of application No. 12/729,207, filed on Mar. 22, 2010.

(60) Provisional application No. 61/252,066, filed on Oct. 15, 2009, provisional application No. 61/260,781, filed on Nov. 12, 2009.

(51) Int. Cl.
*H04W 24/00* (2009.01)
*G06F 17/30* (2006.01)
(52) U.S. Cl. .................. 701/36; 701/2; 701/24; 701/25; 701/40; 701/33.2; 340/5.1; 340/5.8; 340/995.1; 340/438; 455/456.2; 455/457; 709/219; 709/220; 709/229; 726/26; 726/27; 726/28
(58) Field of Classification Search .................. 701/630, 701/516, 631, 159
See application file for complete search history.

(56) References Cited

U.S. PATENT DOCUMENTS 5,898,910 A 4/1999 Miyake
(Continued)

FOREIGN PATENT DOCUMENTS

CA 2242494 9/1997
(Continued)

OTHER PUBLICATIONS

Anonymous: "NAVTEQ, Nokia and Magneti Marelli Integrate Smartphone Into Car Entertainment System," Internet citation, Sep. 17, 2009, pp. 1-3. Retrieved from the Internet: URL: http://www.gadgetpaper.com/navteq-nokia-and-magneti-marelli-integrate-smartphone-into-care-entertainment-system/ [retrieved on Jan. 28, 2011] p. 2, paragraph 1-3.

(Continued)

*Primary Examiner* — Thomas Tarcza
*Assistant Examiner* — Adam Tissot
(74) *Attorney, Agent, or Firm* — Stolowitz Ford Cowger LLP

(57) ABSTRACT

In one example, a network device stores a mapping of application operation modes to vehicle conditions such as a first condition of the vehicle powered but not moving and a second condition of the vehicle moving. The network device receives a wirelessly transmitted request for a particular application to utilize an interface powered by the vehicle. The network device compares an application identifier specified by the received request to the mapping. The network device then identifies a portion of the vehicle interface according to the comparison and signals control software on the vehicle to grant the particular application access to only the identified portion of the vehicle interface itself. The application can reside on the mobile device and utilize the vehicle interface as an extended interface, or the application can reside on the vehicle.

4 Claims, 15 Drawing Sheets

U.S. PATENT DOCUMENTS

| | | | |
|---|---|---|---|
| 6,105,063 A | 8/2000 | Hayes, Jr. |
| 6,148,253 A | 11/2000 | Taguchi et al. |
| 6,175,789 B1 | 1/2001 | Beckert et al. |
| 6,356,812 B1 | 3/2002 | Cragun |
| 6,434,450 B1 | 8/2002 | Griffin, Jr. et al. |
| 6,487,717 B1 | 11/2002 | Brunemann et al. |
| 6,553,375 B1 | 4/2003 | Huang et al. |
| 6,650,534 B2 | 11/2003 | Tree |
| 6,799,201 B1 | 9/2004 | Lee et al. |
| 6,812,942 B2 | 11/2004 | Ribak |
| 6,853,910 B1 | 2/2005 | Oesterling |
| 6,915,176 B2 | 7/2005 | Novelli |
| 6,961,536 B2 | 11/2005 | Himmel |
| 6,973,476 B1 | 12/2005 | Naden et al. |
| 6,981,022 B2 | 12/2005 | Boundy |
| 7,053,866 B1 | 5/2006 | Mimran |
| 7,062,528 B2 | 6/2006 | Deguchi |
| 7,107,234 B2 | 9/2006 | Deguchi |
| 7,127,454 B2 | 10/2006 | Deguchi |
| 7,139,660 B2 | 11/2006 | Sarkar et al. |
| 7,190,798 B2 | 3/2007 | Yasuhara |
| 7,190,971 B1 | 3/2007 | Kawamoto |
| 7,206,574 B2 | 4/2007 | Bright |
| 7,218,925 B2 | 5/2007 | Crocket |
| 7,251,473 B2 | 7/2007 | Alrabady |
| 7,346,435 B2 | 3/2008 | Amendola |
| 7,362,239 B2 | 4/2008 | Franczyk et al. |
| 7,363,357 B2 | 4/2008 | Parupudi et al. |
| 7,366,892 B2 | 4/2008 | Spaur |
| 7,379,541 B2 | 5/2008 | Iggulden et al. |
| 7,403,769 B2 | 7/2008 | Kopra |
| 7,437,183 B2 | 10/2008 | Makinen |
| 7,461,122 B2 | 12/2008 | Kawana |
| 7,467,028 B2 | 12/2008 | Pilgrim |
| 7,480,512 B2 | 1/2009 | Graham |
| 7,505,732 B2 | 3/2009 | McDonough |
| 7,613,564 B2 | 11/2009 | Vorona |
| 7,623,949 B2 | 11/2009 | Nou |
| 7,634,095 B2 | 12/2009 | Arun |
| 7,643,788 B2 | 1/2010 | Habaguchi |
| 7,643,913 B2 | 1/2010 | Taki et al. |
| 7,657,368 B2 | 2/2010 | Weiss et al. |
| 7,676,830 B2 | 3/2010 | Kuz |
| 7,684,908 B1 | 3/2010 | Ogilvie et al. |
| 7,805,542 B2 | 9/2010 | Hindman |
| 7,812,712 B2 | 10/2010 | White |
| 7,815,100 B2 | 10/2010 | Adams |
| 7,885,599 B2 | 2/2011 | Yuhara |
| 8,014,915 B2 | 9/2011 | Jeon |
| 2002/0087655 A1 | 7/2002 | Bridgman et al. |
| 2002/0091848 A1 | 7/2002 | Agresta |
| 2003/0003892 A1 | 1/2003 | Makinen |
| 2003/0147534 A1 | 8/2003 | Ablay |
| 2003/0195925 A1 | 10/2003 | Kaneko et al. |
| 2004/0019416 A1 | 1/2004 | Chen et al. |
| 2004/0259545 A1 | 12/2004 | Morita |
| 2005/0031100 A1 | 2/2005 | Iggulden |
| 2005/0060350 A1 | 3/2005 | Baum |
| 2005/0085965 A1 | 4/2005 | Issa et al. |
| 2005/0132024 A1 | 6/2005 | Habaguchi et al. |
| 2005/0193087 A1 | 9/2005 | Swindells et al. |
| 2005/0216553 A1 | 9/2005 | Mallonee et al. |
| 2005/0216902 A1 | 9/2005 | Schaefer |
| 2005/0221878 A1 | 10/2005 | Van Bosch |
| 2005/0278080 A1 | 12/2005 | Pilgrim |
| 2005/0283284 A1 | 12/2005 | Grenier et al. |
| 2006/0015221 A1 | 1/2006 | Sarkar |
| 2006/0025897 A1 | 2/2006 | Shostak |
| 2006/0025907 A9 | 2/2006 | Kapolka |
| 2006/0036356 A1 | 2/2006 | Rasin et al. |
| 2006/0041337 A1 | 2/2006 | Augsburger |
| 2006/0141962 A1 | 6/2006 | Forbes |
| 2006/0156298 A1 | 7/2006 | Min et al. |
| 2006/0161312 A1 | 7/2006 | Juengling |
| 2006/0253874 A1 | 11/2006 | Stark |
| 2006/0294514 A1 | 12/2006 | Bauchot et al. |
| 2007/0005206 A1 | 1/2007 | Zhang |
| 2007/0021885 A1 | 1/2007 | Soehren |
| 2007/0043829 A1 | 2/2007 | Dua |
| 2007/0100513 A1 | 5/2007 | Asano |
| 2007/0100766 A1 | 5/2007 | Healy |
| 2007/0126604 A1* | 6/2007 | Thacher .................. 340/995.13 |
| 2007/0143798 A1 | 6/2007 | Jira et al. |
| 2007/0200663 A1 | 8/2007 | White |
| 2007/0265744 A1 | 11/2007 | Nicolai |
| 2007/0265745 A1 | 11/2007 | Styles |
| 2007/0272423 A1 | 11/2007 | Cutler |
| 2007/0281606 A1 | 12/2007 | Baunach |
| 2008/0005733 A1 | 1/2008 | Ramachandran et al. |
| 2008/0007120 A1 | 1/2008 | Weyl |
| 2008/0071882 A1 | 3/2008 | Hering |
| 2008/0143497 A1 | 6/2008 | Wasson |
| 2008/0172147 A1 | 7/2008 | Taki |
| 2008/0214236 A1 | 9/2008 | Harb |
| 2008/0248742 A1* | 10/2008 | Bauer et al. .................. 455/3.06 |
| 2008/0249886 A1 | 10/2008 | Woodard, Jr. |
| 2008/0266051 A1 | 10/2008 | Taki |
| 2008/0268810 A1 | 10/2008 | Kobayashi |
| 2008/0269961 A1 | 10/2008 | Shitanaka |
| 2009/0075624 A1 | 3/2009 | Cox |
| 2009/0079555 A1 | 3/2009 | Aguirre De Carcer et al. |
| 2009/0119657 A1 | 5/2009 | Link, II |
| 2009/0128286 A1 | 5/2009 | Vitito |
| 2009/0138942 A1* | 5/2009 | Alrabady et al. .................. 726/4 |
| 2009/0204815 A1 | 8/2009 | Dennis |
| 2009/0215466 A1 | 8/2009 | Ahl et al. |
| 2009/0265173 A1 | 10/2009 | Madhavan |
| 2009/0265633 A1 | 10/2009 | Lim |
| 2009/0265701 A1 | 10/2009 | Naslavsky |
| 2009/0300595 A1 | 12/2009 | Moran |
| 2010/0037057 A1 | 2/2010 | Shim et al. |
| 2010/0082559 A1 | 4/2010 | Sumcad et al. |
| 2010/0088367 A1 | 4/2010 | Brown |
| 2010/0115505 A1 | 5/2010 | Touati |
| 2010/0125387 A1 | 5/2010 | Sehyun et al. |
| 2010/0153207 A1 | 6/2010 | Roberts et al. |
| 2010/0222939 A1 | 9/2010 | Namburu |
| 2010/0235045 A1 | 9/2010 | Craig |

FOREIGN PATENT DOCUMENTS

| | | |
|---|---|---|
| DE | 102 26 425 A1 | 12/2003 |
| DE | 10 2005 044943 A1 | 3/2006 |
| EP | 0 978 433 A2 | 2/2000 |
| EP | 1125784 | 8/2001 |
| EP | 1205883 B1 | 6/2008 |
| EP | 2012090 A2 | 1/2009 |
| WO | WO 02/19116 A2 | 3/2002 |
| WO | WO 03/034235 A1 | 4/2003 |
| WO | WO 2005/105509 A1 | 11/2005 |
| WO | 2006023713 | 3/2006 |
| WO | 2007/057895 A2 | 5/2007 |
| WO | WO 2007/092463 A2 | 8/2007 |
| WO | 2008/055117 A2 | 5/2008 |
| WO | 2008050136 | 5/2008 |
| WO | 2008124795 | 10/2008 |
| WO | 2009/016917 A1 | 2/2009 |
| WO | WO 2011-046823 A2 | 4/2011 |
| WO | WO 2011-047037 A1 | 4/2011 |
| WO | WO 2011-047045 A1 | 4/2011 |
| WO | WO 2011-047052 A1 | 4/2011 |
| WO | WO 2011-047056 A1 | 4/2011 |

OTHER PUBLICATIONS

Global Patent Solutions LLC, "Additional Search Results" for Search Name: Centralized Management of Motor Vehicle Software Applications and Services, Dec. 27, 2010.

Global Patent Solutions LLC, "Additional Search Results" dated Feb. 5, 2011.

Global Patent Solutions LLC, "Additional Search Results" dated Feb. 10, 2011.

International Search Report dated Dec. 15, 2010 for PCT/US10/52515.

International Search Report dated Dec. 20, 2010 for PCT/US2010/052511.

International Search Report dated Feb. 10, 2011 for PCT/US2010/052493.

International Search Report dated Feb. 10, 2011 for PCT/US2010/052502.

"3rd Generation Partnership Project; Technical Specification Group Services and System Aspects Push Architecture (Release 6); 3GPP TR 23.976," ETSI Standards; v. 3-SA2, No. V6 1.0; pp. 1-34, Jun. 1, 2004.

Supplementary European Search Report based on EP 06 71 9988 completed Jun. 13, 2008.

United States Patent and Trademark Office ISA; PCT International Search Report; PCT/US2008/056323; Jun. 30, 2008; 2 pages.

European Patent Office; International Search Report for PCT/US2009/062431; Jan. 25, 2010.

Stolowitz Ford Cowger LLP—List of Related Cases; Apr. 5, 2011.

Visteon Corporation; "Visteon Helps Connect Drivers and Passengers to Their Vehicles . . . and Their Vehicles to the World"; Jan. 7, 2010; http://www.prnewswire.com/news-releases/visteon-helps-connect-drivers-and-passengers-to-their-vehicles----and-their-vehicles-to-the-world-80902587.html.

Marisetty et al.; "An Architecture for In-Vehicle Infotainment Systems"; Jan. 29, 2010; http://www.drdobbs.com/embedded-systems/222600438.

Ryu et al.; "The Design of Remote vehicle Management System Based on OMA DM Protocol and AUTOSAR S/W Architecture"; Jul. 23-25, 2008.

Nilsson et al.; "Secure firmware updates over the air in intelligent vehicles"; May 19-23, 2008.

IBM; "Mobile Device used as an External Graphical User Interface for Telematics Hardware installed in a Car. Demonstrating Speeding control and Road User Charge"; Oct. 13, 2005.

Alpine Electronics of America, Inc.; "Alpine Launches Mobile Phone Solution That Integrates With Car Audio Head Units"; Dec. 23, 2009.

Global Patent Solutions LLC, "Search Report" for Search Name: Centralized Management of Motor Vehicle Software Applications and Services, Jul. 30, 2010.

UTC, "Vehicle Console Personalization" Aug. 10, 2006.

IBM, "Mobile Device used as an External Graphical User Interface for Telematics Hardware installed in a Car. Demonstrating Speeding Control and Road User Charge.." Oct. 13, 2005 UTC loaded into IP.com Prior Art Database.

UTC, "Hybrid Vehicular Display" Aug. 24, 2004.

Fuchs et al. "End to End Content Delivery Using UPnP and WiFi Network." In: Connected Services in Mobile Networks—San Diego, CA, USA. Jan. 10-12, 2004. Retrieved on Jan. 7, 2012 from the internet at URL: <http://citeseerx.ist.psu.edu/viewdoc/download-?doi=10.1.1.110.7788&rep=rep1&type=pdf>. Entire document.

* cited by examiner

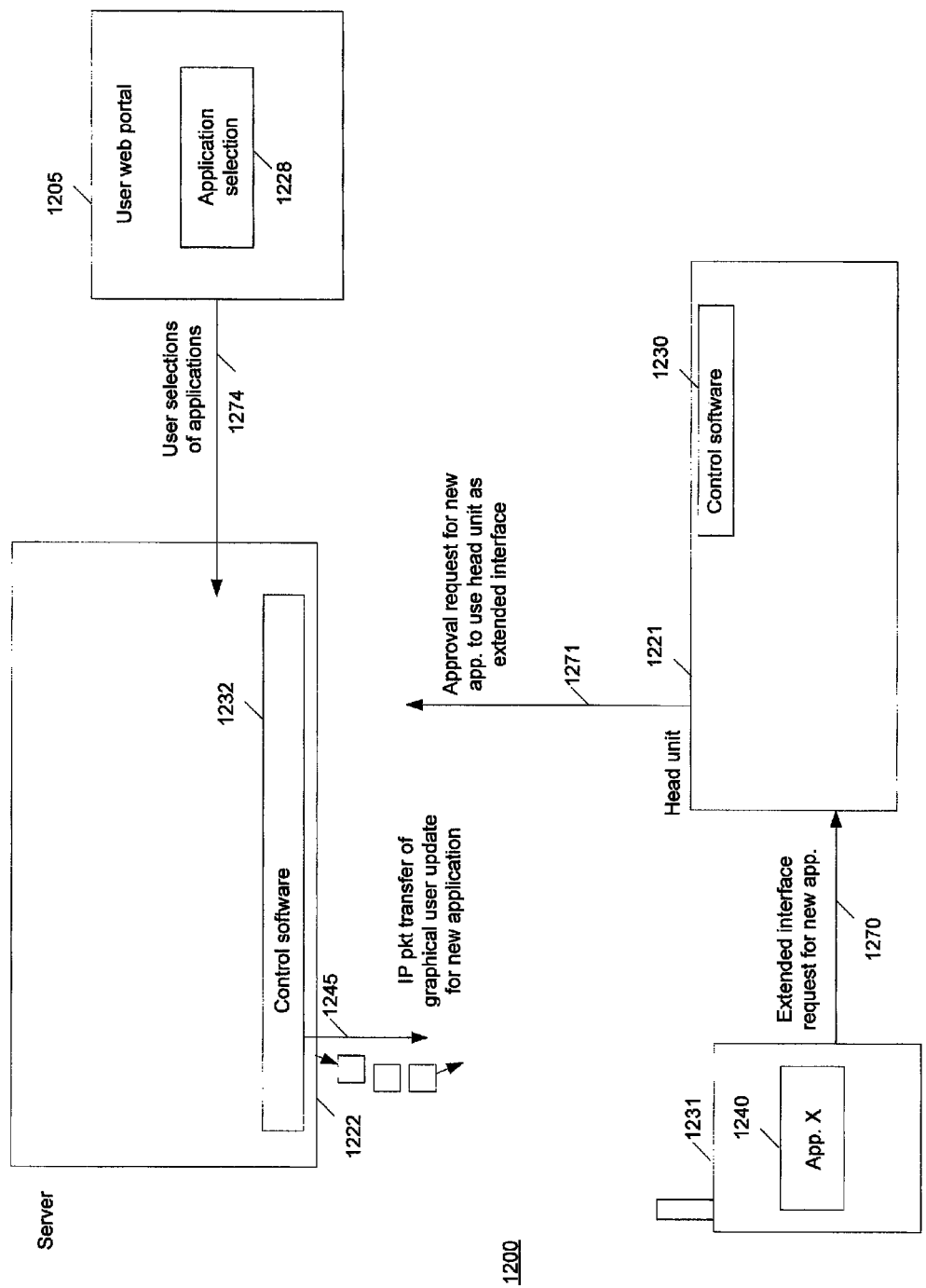

CENTRALIZED MANAGEMENT OF MOTOR VEHICLE SOFTWARE APPLICATIONS AND SERVICES

RELATED APPLICATIONS

This application is a continuation of Ser. No. 12/777,989 filed on May 11, 2010, entitled: CENTRALIZED MANAGEMENT OF MOTOR VEHICLE SOFTWARE APPLICATIONS AND SERVICES, which is a continuation-in-part of U.S. patent application Ser. No. 12/729,207 filed on Mar. 22, 2010, entitled: CENTRALIZED MANAGEMENT OF MOTOR VEHICLE SOFTWARE APPLICATIONS AND SERVICES, which is a non-provisional of U.S. Provisional Application No. 61/252,066 filed on Oct. 15, 2009, entitled: CENTRALIZED MANAGEMENT OF MOTOR VEHICLE SOFTWARE APPLICATIONS AND SERVICES and U.S. Provisional Application No. 61/260,781 filed on Nov. 12, 2009, entitled: CENTRALIZED MANAGEMENT OF MOTOR VEHICLE SOFTWARE APPLICATIONS AND SERVICES, each of which is herein incorporated by reference in its entirety.

COPYRIGHT NOTICE

© 2010 Airbiquity, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

A motor vehicle can be equipped with a "head unit" having a user interface. The user interface can include various resource components such as a screen, speakers, a microphone, a touch screen and/or keypad, etc. Smart phones or other mobile phones can download various applications that operate on the phone. A user can utilize a user interface of the phone to control the application and/or utilize the application in some way (such as watching the visual display or listening to the audio output).

Extending applications from the mobile phone to the head unit has become a popular feature offered by various service providers and vehicle manufacturers. As a result, the user can take advantage of better user interface components offered by the head unit (e.g. a larger screen and higher quality audio output). It is desirable to provide a mechanism to control, manage, and arbitrate the extension of mobile phone applications operating on the head unit utilizing the service control logic available in a remote server.

Vehicles can also be manufactured with components that allow the applications to be installed on the vehicle itself (as opposed to being installed on a mobile device). It is desirable to control, manage, and arbitrate the use of the vehicle interface by these applications as well.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one example, a network device stores a mapping of application operation modes to vehicle conditions such as a first condition of the vehicle powered but not moving and a second condition of the vehicle moving. The network device receives a wirelessly transmitted request (sent by either a wireless transmitter of the vehicle or of a mobile device coupled to the vehicle) for a particular application to utilize an interface powered by the vehicle. The network device compares an application identifier specified by the received request to the mapping. The network device then identifies a portion of the vehicle interface according to the comparison and signals control software on the vehicle to grant the particular application access to only the identified portion of the vehicle interface. The application can reside on the mobile device and utilize the vehicle interface as an extended interface, or the application can reside on the vehicle itself. Additional aspects and advantages of this invention will be apparent from the following detailed description of preferred embodiments, which proceeds with reference to the accompanying drawings.

BRIEF DESCRIPTION OF THE DRAWINGS

FIG. 12 illustrates a system to push graphical user interface updates to the head unit in response to the mobile device generating a request for a new application or the user web portal selecting a new application.

DETAILED DESCRIPTION OF PREFERRED EMBODIMENTS

In one example, a user couples a phone to a motor vehicle head unit using a wired or wireless connection for the purpose of using the head unit as an extended interface for the phone. The user may be permitted to control an application on the phone using the interface of the head unit, depending on a determination via a remote server as described in the next paragraph. Similarly, the user may be permitted to watch or listen to an output of the application over the interface of the head unit, depending on a determination via a remote server as described in the next paragraph.

Novel client control software on the phone and the head unit interfaces with novel server control software on a remote server over a wireless connection extending from the phone. The client control software identifies a phone application to utilize the head unit as an extended interface. The server control software compares the identified phone application to one or more databases accessible by the remote server. Based on the comparison, the server control software determines whether the identified application will be permitted to utilize the head unit as an extended interface, and if so, which components of the head unit interface will be permitted to be used by the application. The server control software signals the client control software to control the phone and head unit according to the determination. Accordingly, any utilization of the head unit as an extended interface can be controlled in a safe and intelligent manner.

Figure 1:
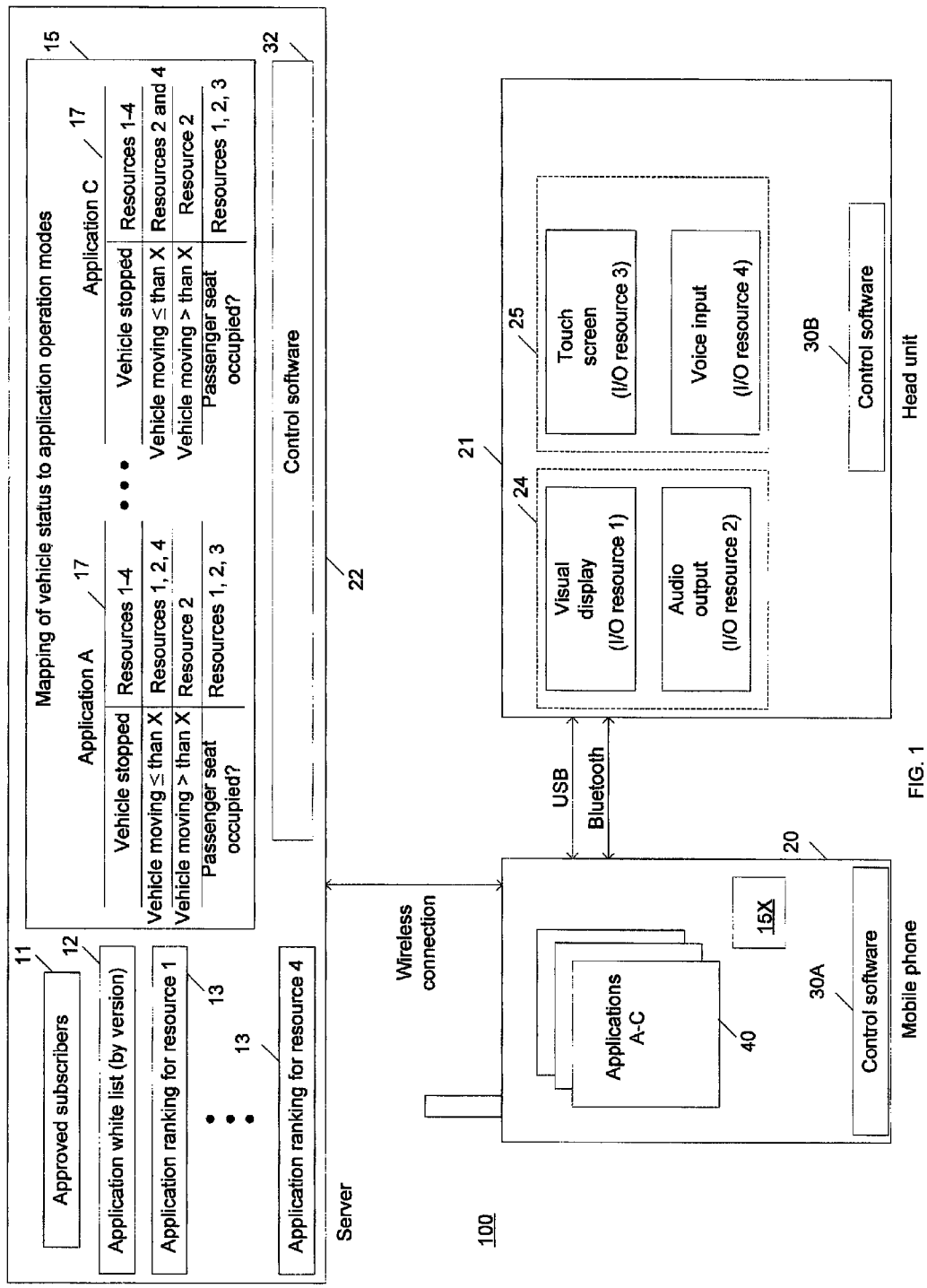
FIG. 1 illustrates a system to control the use of a head unit as an extended interface for a phone application in a safe and intelligent manner.

FIG. 1 illustrates a system to control the use of a head unit as an extended interface for a phone application in a safe and intelligent manner.

The system 100 includes software 30A and 30B configured on, respectively, a mobile phone 20 (or other mobile device) and head unit 21 (or other interface powered by a motor vehicle such as a user interface integrated with a steering wheel or a user interface integrated with a seat back). The software 30A and 30B interfaces with the software 32 configured on a remote server 22 to regulate and control when and how applications 40 operating on the phone 20 access I/O resources 1-4 of the head unit 21.

Figure 2A:
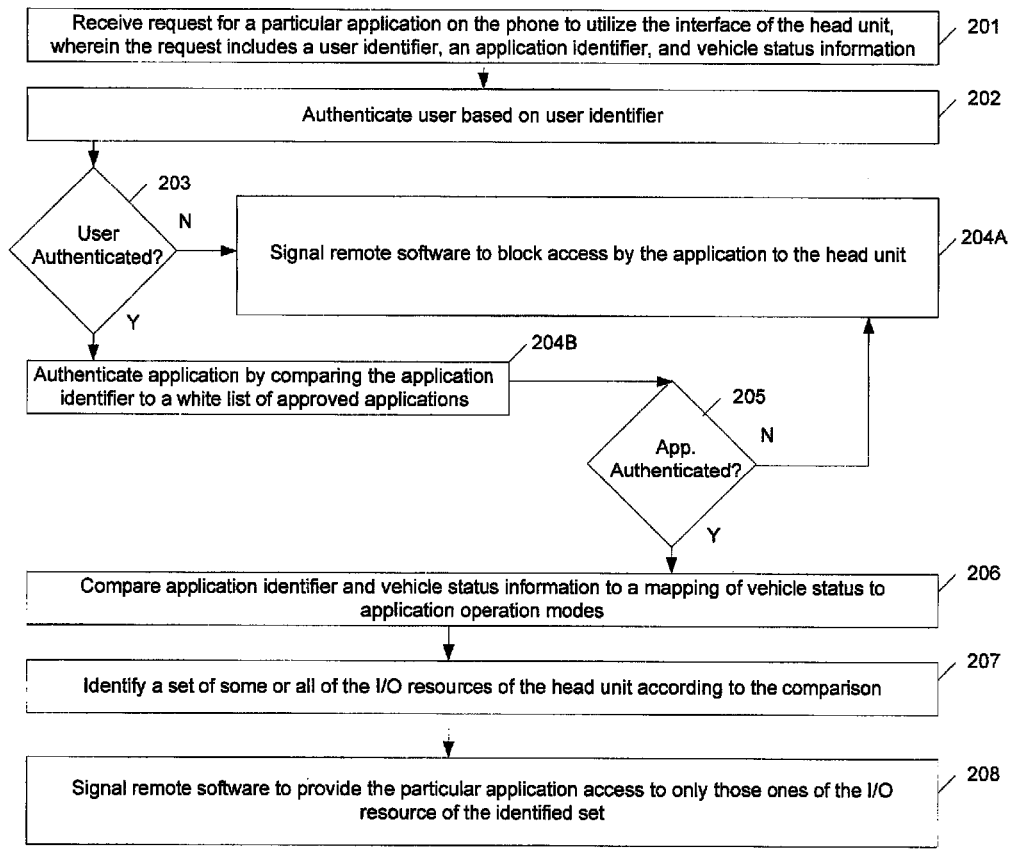
FIG. 2A illustrates a flow chart showing operation of the software 32 of FIG. 1.

FIG. 2A illustrates a flow chart showing operation of the software 32 of FIG. 1.

In block 201, the software 32 receives a request for a particular application 40 on the phone 20 to utilize the interface (including input 24 resources 1-2 and output 25 resources 3-4) of the head unit 21. The request includes a user identifier corresponding to the user of the motor vehicle and/or head unit 21, an application identifier corresponding to the particular application 40, and vehicle status information. The user identifier could be an identifier provided by the user when the control software 30A was first activated in the mobile phone 100, user's phone number, etc.

In block 202, the software 32 authenticates the user. This can include determining whether the user identified by the user identifier matches a database 11 of subscribers for the service of extending the interface of the phone 20 using the head unit 21. If the user is not authenticated in diamond 203, then in block 204A the software 32 signals the software 30A/B to block access by the application 40 to the head unit 21. It should be understood that the system 100 can be configured so that block 202 is optional.

Otherwise, if the user is authenticated, then in block 204B the software 32 authenticates the application 40 by comparing the application identifier to a list 12 of applications (also referred to as a whitelist). This list 12 can be compared by version number such that one particular version of an application 40 can be identified on the list while a different version is excluded. If the particular application 40 (or particular version) is not on the list 12 in diamond 205, then in block 204A the software 32 signals the software 30A-B to block access by the application 40 to the head unit 21.

Otherwise, if the application 40 is authenticated, then in block 206 the software 32 compares the application identifier and the current vehicle status information to a mapping 15 of application operation modes. As shown, the mapping 15 can have an entry 17 for each application 40 of the list 12. Each entry 17 includes a mapping that is particularized for the corresponding application 40. For example, an entry 17 for application A maps the vehicle status "vehicle moving ≦than X" to resources 1, 2, and 4 (namely application A will be permitted to access the only the screen 1, the speaker 2, and microphone 4 under this vehicle condition) whereas the entry 17 for application C maps the vehicle status "vehicle moving ≦than X" to only resources 2 and 4 (namely application C will be permitted to access the speaker 2 and microphone 4). One real world example might be a navigation application A and a video game application C, where even when a passenger is present the system 100 will not allow the video game application C to be displayed on the head unit 21 screen 1 as this is deemed to be too much of a distraction for a driver whereas the navigation application A can be displayed on the head unit 21 screen 1. Another real world application can be a vehicle with a plurality of interfaces, such as a head unit and a display attached to the back of a seat. An application can be granted access to the back seat display under conditions where the same application would not be granted access to the head unit.

It should be understood that, in other examples, the mapping 15 can be stored on the mobile phone 20. In this case, the comparison described in the previous paragraph can be performed by the control software 30A. In such a case, the control software 30A checks the current vehicle status by communicating with the head unit 21.

In block 207, the software 32 identifies a set of some or all of the I/O resources of the head unit 21 according to the comparison. In block 208, the software 32 signals the remote software to provide the particular application 40 access to only those ones of the I/O resources 1-4 of the identified set. In one example, such signaling can include controlling the software 30A on the mobile phone 20 so that all access requests sent from the mobile phone 20 conform to the identified set of the I/O resources. In another example, such signaling can include controlling the software 30B on the head unit 21 to block access requests sent from the mobile phone 20 in any manner such as by simply disabling I/O resources on the head unit 21. In yet other examples, such signaling can include controlling both the software 30A and the software 30B.

Figure 2B:
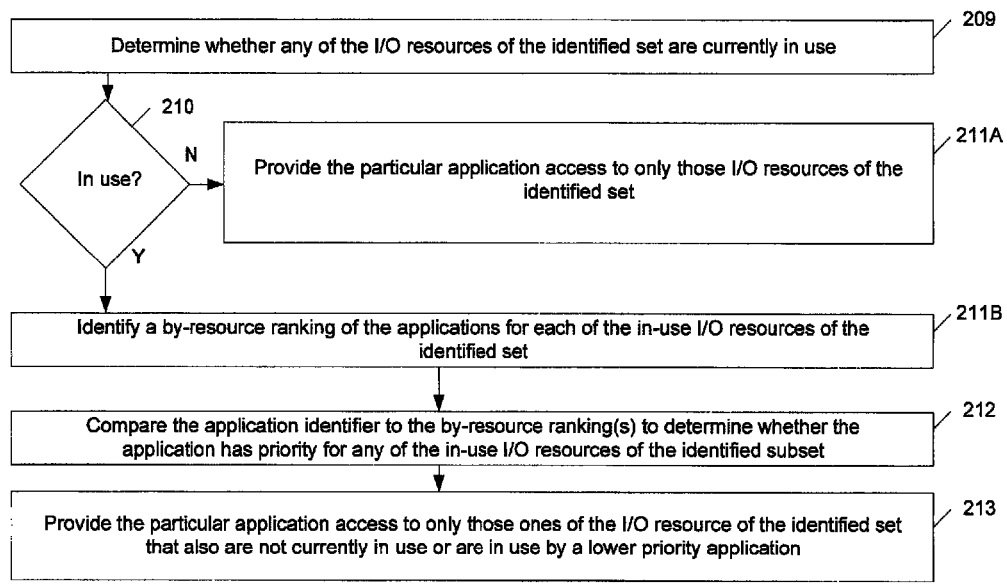
FIG. 2B illustrates a flow chart showing a contention scheme that can be used by the software 32 of FIG. 1.

FIG. 2B illustrates a flow chart showing a contention scheme that can be used by the software 30B of FIG. 1. A contention scheme can be utilized in addition to the scheme shown in FIG. 2A.

In block 209, the software 30B determines whether any of the I/O resources of the identified set are currently in use. If none are in use in diamond 210, then in block 211A the software 30B provides the particular application access to only those I/O resources of the identified set.

Otherwise, if at least one of the resources of the set is in use, then in block 211B the software 30B identifies a by-resource ranking 13 of the applications for each of the in-use resources of the identified set. This is shown in FIG. 1 where there is a ranking 13 for each resource 1-4. In block 212, the software 30B compares the application identifier to the by-resource ranking(s) 13 to determine whether the application 40 has priority for any of the in-use resources of the identified subset (the may be performed via signaling since the ranking 13 is shown on the remote server or the ranking may have been sent to the vehicle interface in an earlier process). This comparison will indicate whether the application currently using a particular in-use resource is deemed higher or lower priority than the requesting application for that in-use resource. In block 213, the software 30B provides the particular application 40 access to only those ones of the I/O resources 1-4 of the identified set that are also not currently in use or are in use by a lower priority application.

Figure 3:
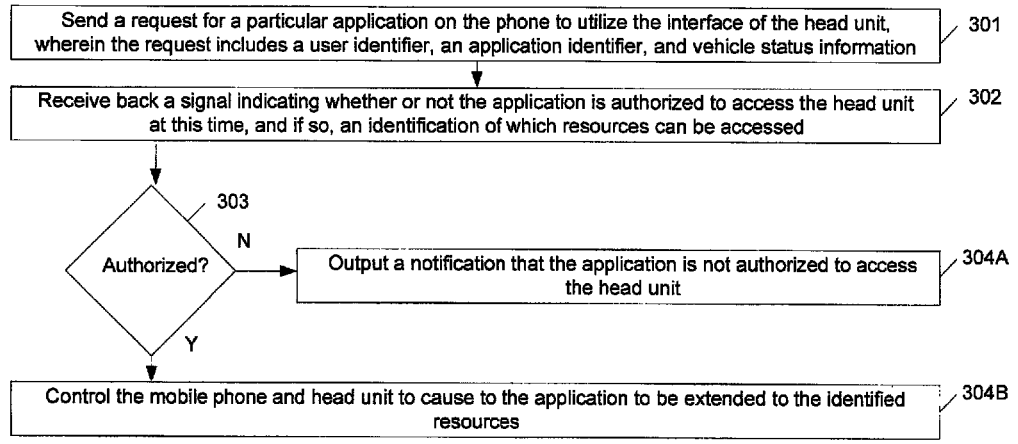
FIG. 3 illustrates a flow chart showing operation of the software 30A-B of FIG. 1.

FIG. 3 illustrates a flow chart showing operation of the software 30A-B of FIG. 1.

In block 301, the software 30A-B sends a request for a particular application 40 on the phone 20 to utilize the interface of the head unit 21. In block 302, the software 30A-B receives back a signal indicating whether or not the application 40 is authorized to access the head unit 21 at this time, and if so, an identification of which resources 1-4 can be utilized. If the application 40 is not authorized in diamond 303, then in block 304A the software 30A-B outputs a notification that the application 40 is not authorized to access the head unit. This notification could be output by the mobile phone 20 or the head unit 21, or both.

Otherwise, if the application 40 is authorized in diamond 303, then in block 304B the software 30A-B controls the mobile phone 20 and the head unit 21 to cause the application 40 to be extended to the identified resources. If only a subset of possible resources for the application 40 (from the respective mapping 17) are utilized due to a conflict, then the software 30A-B may generate a notification to alert the driver about the lower priority application being suspended before activating the higher priority application. In another example, if the resources are currently used by a lower priority application, software 30A-B can automatically suspend/end the lower priority application and allow the higher priority application to be activated using the required resources.

If it is determined that application 40 can be extended to the head-unit 21, the server 22 can download corresponding "control panel" software to the head unit to control the application 40. By having downloading this software to the head unit 21 based on the application being requested, a service provider can customize and update the "control panel" accordingly when new applications or update to existing applications are available. The head-unit can have a web-code renderer to display the "control panel" software.

Referring again to FIG. 1, the software 30A-B interfaces with the software 32 over a wireless connection extending from the phone 20. This wireless connection can utilize a packet data connection (including but not limited to GPRS, EDGE, EVDO, UTMS, WiMAX, WiFi, etc.), Short Message Service (SMS), or In-Band-Signaling modems on the mobile phone 20 and the remote server 22 as described in U.S. Pat. Nos. 6,144,336; 6,690,681; and 6,493,338.

Still referring to FIG. 1, it is noted that the mobile phone 20 can couple to the head unit 21 by using a connection such as a USB, Bluetooth, or WiFi connection. These are just examples, however, and in other cases a different connection and/or protocol may be suitable for utilizing the interface of the head unit 21 for the application 40 of the phone 20.

It should be understood that the mapping 15 can have any vehicle statuses and that the four illustrated examples are merely some examples. For example, another vehicle status could be whether the vehicle is moving more than speed 'X' AND a passenger is present.

It should be understood the head unit 21 can include less than all the example resources shown, or other resources that are not shown. For example, another possible I/O resource component is a text to speech component.

In the illustrated example, a first application can be permitted to access a first subset of whichever resources are actually present on the head unit 21 based on an intelligent decision by the system 100, while a second different application can be permitted to access a second subset of the resources, or even all of the resources.

It should be understood that the applications 40 can be ranked "by resource" as illustrated or there can be a single ranking including all the applications 40. The system 100 is implemented with the "by resource" ranking as shown, but the concepts described herein could be implemented in another system that ranks applications independently of resource.

Figure 4:
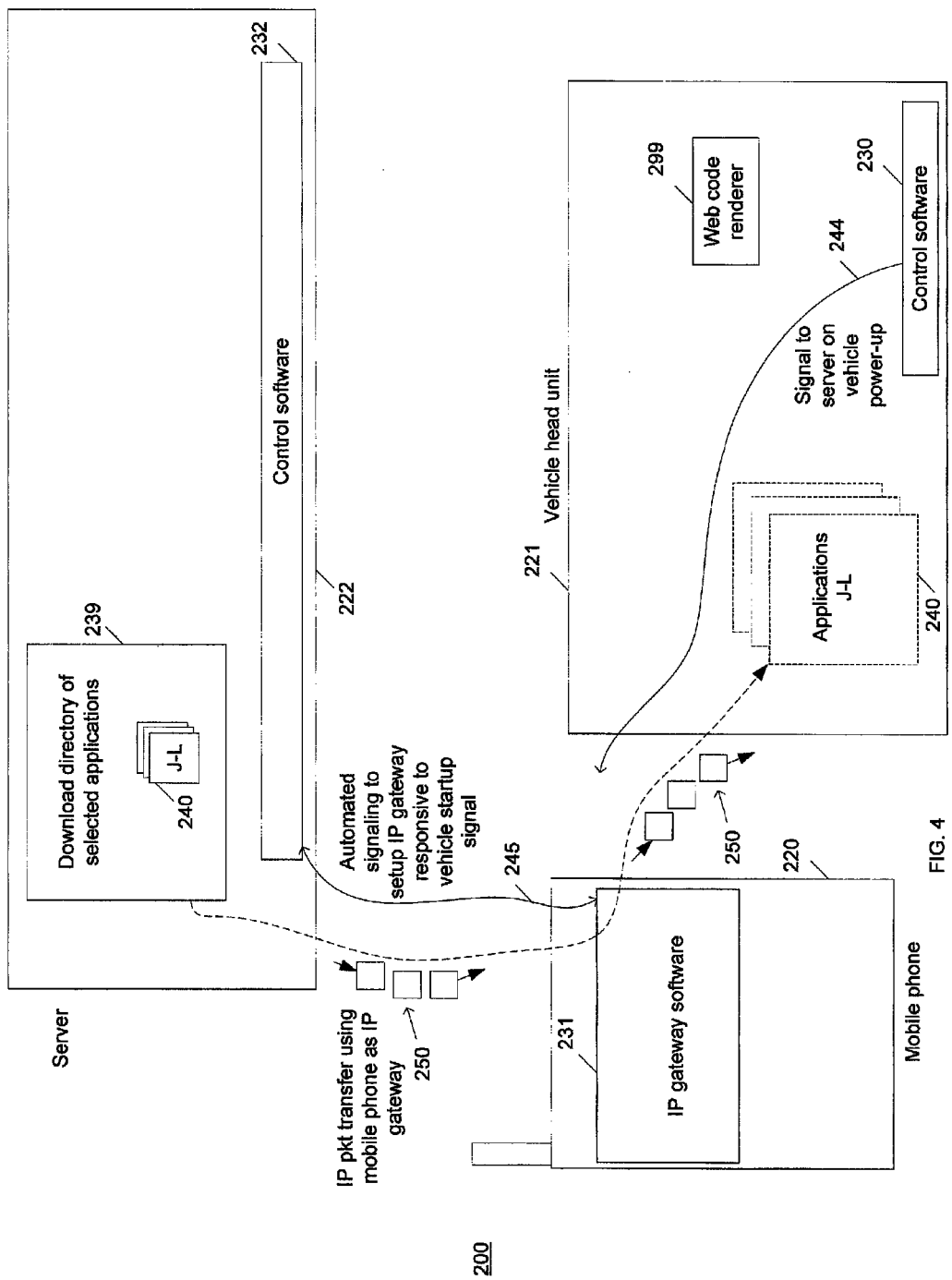
FIG. 4 illustrates a system to select and distribute applications to a vehicle in a safe and intelligent manner.

FIG. 4 illustrates a system to select and distribute applications to a vehicle in a safe and intelligent manner.

One difference between the previously discussed system of FIG. 1 and the system of FIG. 4 is the install location for applications. Whereas the applications A-C in the system 100 of FIG. 1 are installed and operating on the mobile phone 20 (using the head unit 21 or other interface powered by the vehicle as an extended interface), the applications J-L in the system 200 of FIG. 4 are installed on the head unit 221 or other component powered by the vehicle. In system 200 of FIG. 4, the software 230-232 enables a provider to select which applications can be installed on the head unit 221 and control distribution of the selected applications to the vehicle.

Before discussing the details of system 200 in the following paragraphs, it should be apparent that the structures and functions of system 100 described in FIGS. 1-3 can be combined with the structures and functions of system 200 (FIGS. 4-6) into a single system. For example, a single system could include some applications installed on a mobile phone using an interface of a vehicle as an extended interface and some applications installed on a component of the vehicle.

Figure 5:
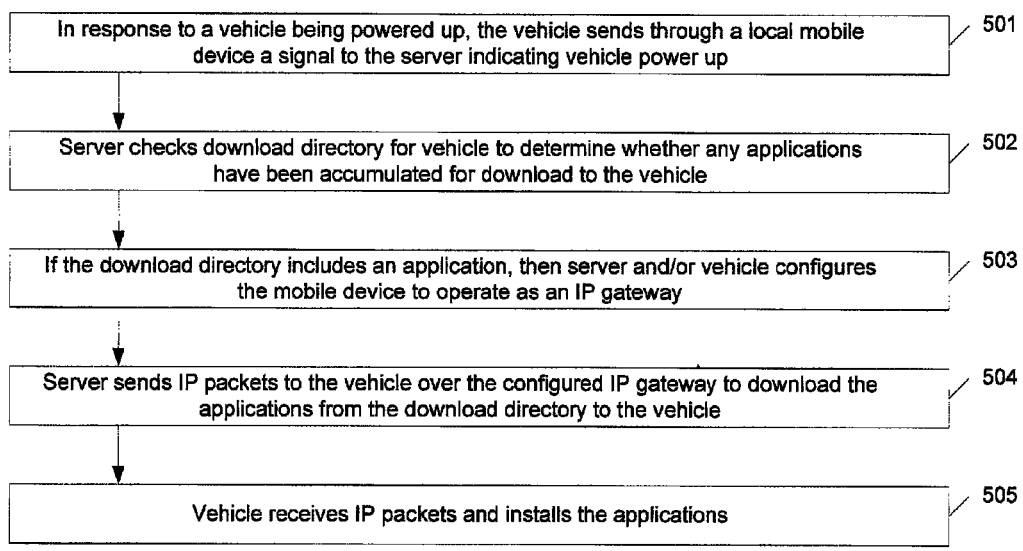
FIG. 5 illustrates a flow chart showing operation of the software of FIG. 4.

FIG. 5 illustrates a flow chart showing operation of the software of FIG. 4.

In block 501, in response to the vehicle being powered up, the control software 230 sends a signal 244 to the server 222 indicating vehicle power-up. The signal 244 can be sent over a local connection such as a USB or Bluetooth connection to be relayed by the mobile device 220 over a wireless telecommunications network.

In block 502, the software 232 checks a download directory 239 (sometimes referred to as a "sandbox") associated with the vehicle to determine if there are any applications to be downloaded to the vehicle. A scheme for intelligently selecting applications that are present in the download directory 239 will be discussed in detail later with reference to FIG. 6.

If the check by the software 232 indicates that the download directory 239 includes at least one application, the process continues. For now, let it be assumed for the purposes of illustration that the download directory 239 includes applications 240 (J-L). Accordingly, in block 503 the software 232 generates and sends signaling 245 to cause the IP gateway software 231 on the mobile phone 220 to operate as an IP gateway for forwarding applications to the head unit 221. In one example, signaling 245 includes communications to dynamically load the mobile phone 220 with the software 231 in response to the determination in block 502 and cause the software 231 to operate thereon for the download to vehicle. The signaling 245 may not take place if the mobile phone 220 is already loaded with the software 231 and ready for IP gateway operation. In other examples, the signaling 245 could originate from the control software 230 on the head unit 221 in response to detecting vehicle power-up.

In block 504, the software 232 generates and sends IP packets 250 to download the applications 240 onto the vehicle. The IP packets 250 are received by the mobile phone 220 and forwarded by operation of the software 231 to the head unit 221. In block 505, the software 230 receives the IP packets 230 and installs the applications 240 (J-L) on the vehicle (installation can be on components of the head unit 221 or other vehicle components).

Thereafter, a user of the vehicle can operate the applications J-L using the head unit 221 as an interface. It should be understood that the software 230 and 232 can operate according to any of the principles described in FIGS. 1-3. For example, the software 230 and 232 can regulate utilization of the I/O resources of the head unit 221 by the active application(s) according to current vehicle status. As another example, in systems where applications are installed on both the vehicle and a mobile device, the software 230 and 232 can include all applications that utilize the vehicle interface in an application ranking/priority table similar to the table 13 (FIG. 1).

In one example, the head unit 221 includes a web code renderer 299, for example an HTML renderer, controlled via the software 230. The web code renderer 299 is configured to display HTML code, but unlike a browser, does not allow a user to freely navigate to web locations. Specifically, the web code renderer 299 displays only applications allowed by the provider, e.g. specified by the server 222.

It should be understood that the flow chart described above addresses updating applications installed on the vehicle. The vehicle can also be pre-loaded with certain applications so that some of the applications installed on the vehicle are downloaded according to the flowchart while others are installed thereon during manufacturing.

Thus, based on the principles described above, vehicles can be manufactured with none of the applications installed on the vehicle but instead the applications can downloaded to the vehicles when the drivers are present in the vehicles. The types of applications downloaded to the vehicles are governed by preferences defined in the network server provided by the drivers.

Figure 6:
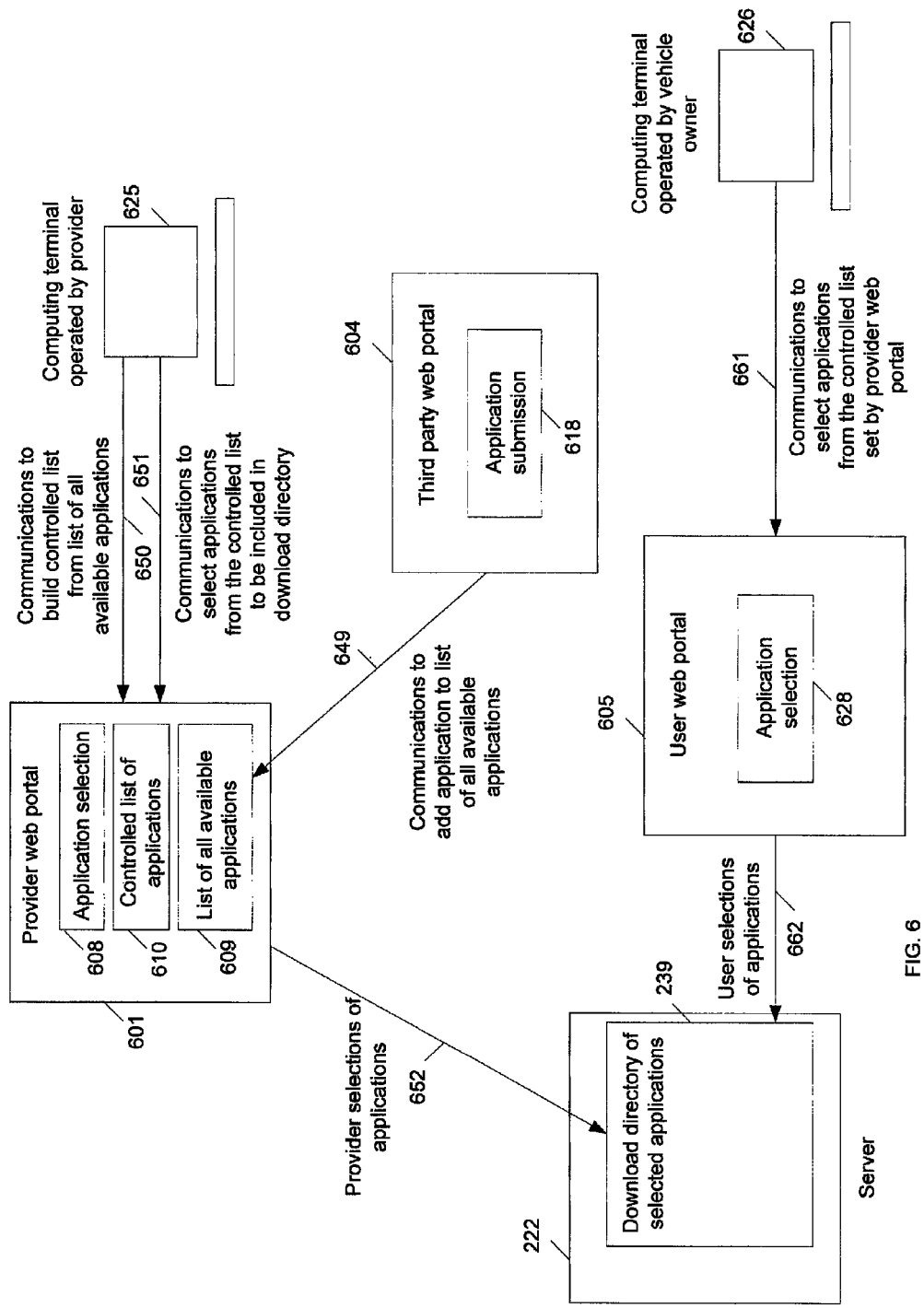
FIG. 6 illustrates more detail of the system shown in FIGS. 4-5.

FIG. 6 illustrates more detail of the system shown in FIGS. 4-5.

It was previously explained that the server 222 includes a download directory 239 of applications waiting to be downloaded on a per-vehicle basis. FIG. 6 illustrates the user web portals 601, 604, and 605 that can be involved in selection of the applications in the download directory 239 and describes an example use of these web portals 601, 604, and 605.

A provider such as an OEM of the vehicle operates the web portal 601. Using an interface such as a computing terminal 625, the provider controls an application selection portion 608 of the web portal 601 with communications 650 to assemble the controlled list 610 of applications from the list 609 of all applications that can be installed on the vehicle. Typically building the list 610 from the list 609 involves validation of the applications from a technical standpoint and/or a business standpoint of the provider.

The provider also sends communications 651 to select applications from the controlled list 610 to be installed on a particular vehicle. These selections may be based on a mapping a vehicle models to applications, for example. These selections 652 fed into the download directory 239.

Regarding the list of all available applications 609, it should be understood that this list can be assembled by applications developed by the provider and/or third parties. In the case of third parties providing applications, the third party uses the application submission 618 portion of the web portal 604 (which is hosted by a web server operated by the provider in one example) to submit an application 649 to be included in the list 609.

A vehicle user can also select applications to be included in the download directory 239 using a computing terminal 626, for example using any internet accessible computing device such as the mobile device or a desktop computer. The computing terminal 626 accesses the application selection portion 628 of the user web portal 605 (which is hosted by a web server operated by the provider in one example) to view the controlled list 610 of applications that can be installed on his vehicle. The user can then send communications 661 to select applications from the controlled list 610 that the user would like installed on his vehicle. These selections 662 are fed into the download directory 239.

The user web portal 605 can also be configured to allow a user to remove particular applications from the download directory 239, e.g. the user may desire to remove one of the provider selected applications 652 added to the download directory 239 via the provider. Removal can be by deletion of an application already sent to the directory 239 or by indicating that a particular application is not desired before such application is ever added to the download directory 239.

According to the above, applications can be accumulated into the per-vehicle download directory 239. At vehicle power-up, such applications can be downloaded and installed onto the vehicle. The download directory 239 can then accumulate new applications until a next vehicle power up.

It should be understood that an interface similar to that of the web portal 605 can be displayed on the head unit of the vehicle. The user could then make selections from such interface for selecting applications from the controlled list 610. The selected applications could be downloaded immediately to the vehicle instead of being put in the download directory when the selections are made from the interface.

Figure 7:
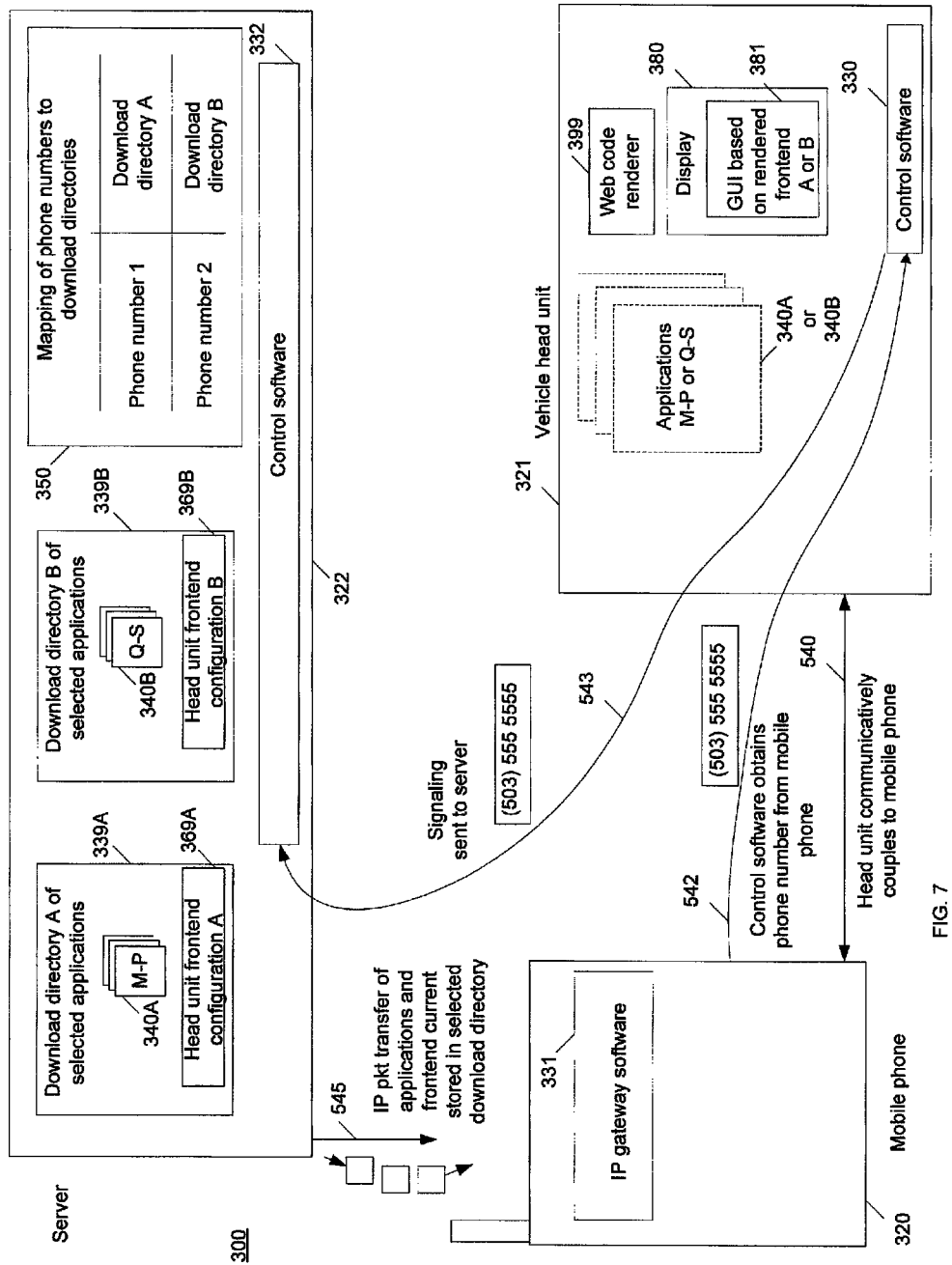
FIG. 7 illustrates a system to select and distribute applications to a vehicle in a safe and intelligent manner according to user preferences.

FIG. 7 illustrates a system to select and distribute applications to a vehicle in a safe and intelligent manner according to user preferences.

One difference between the previously discussed system of FIG. 1 and the system of FIG. 7 is the install location for applications. Whereas the applications A-C in the system 100 of FIG. 1 are installed and operating on the mobile phone 20 (using the head unit 21 or other interface powered by the vehicle as an extended interface), the applications M-P/Q-S in the system 300 of FIG. 7 are installed on the head unit 321 or other component powered by the vehicle. In system 300 of FIG. 7, the software 330-332 enables a provider to select which applications can be installed on the head unit 321 and control distribution of the selected applications to the vehicle.

Before discussing the details of system 300 in detail in the following paragraphs, it should be apparent that the structures and functions of systems 100 and 200 described in FIGS. 1-6 can be combined with the structures and functions of system 300 (FIGS. 7-8) into a single system. For example, a single system could include some applications installed on a mobile phone using an interface of a vehicle as an extended interface and some applications installed on a component of the vehicle.

Figure 8:
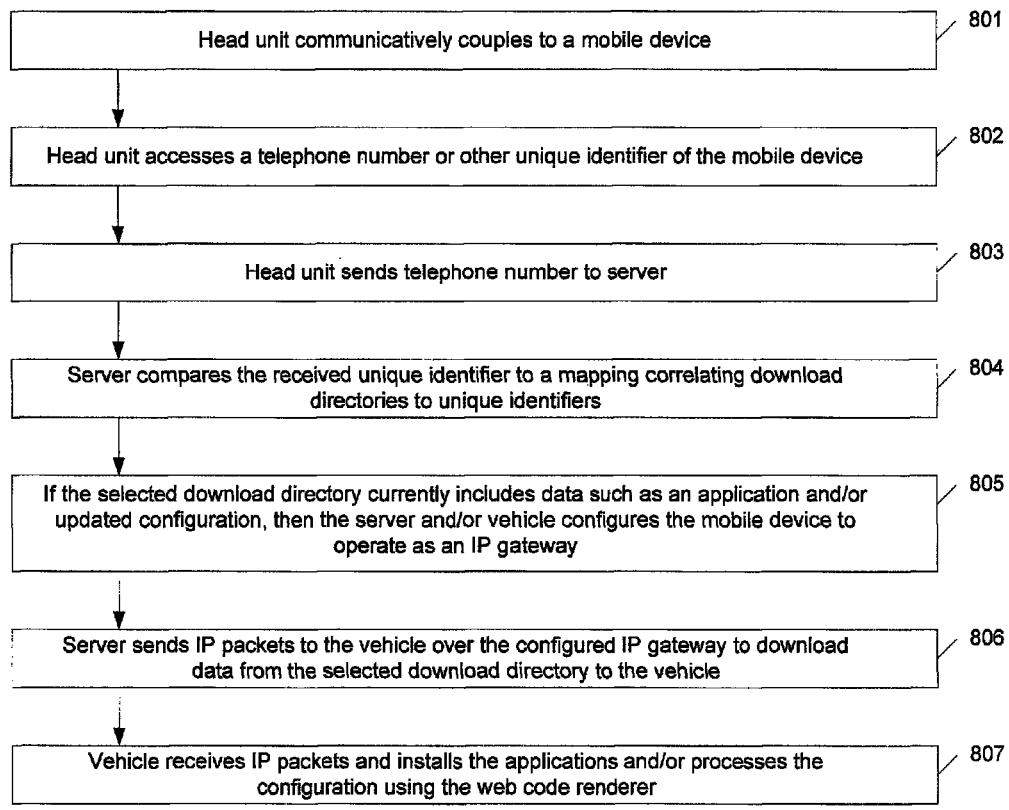
FIG. 8 illustrates a flow chart showing operation of the software of FIG. 7.

FIG. 8 illustrates a flow chart showing operation of the software of FIG. 7.

In block 801, the head unit 321 communicatively couples to a mobile device such as mobile phone 320. In one example, the connection 540 is established via Bluetooth pairing of the head unit 321 and the mobile phone 320. The Bluetooth pairing can be in response to the vehicle being powered up (causing the head unit to power up and search for a Bluetooth device), although it should be apparent that Bluetooth pairing could result from other circumstances such as the mobile phone 320 powering up, the mobile phone 320 being brought within range of the head unit 321, re-pairing after another Bluetooth device is disconnected from the head unit 321, etc. In other examples, the communicative connection can be established by a user connecting the mobile phone 320 to the head unit 321 using a USB connection.

In block 802, the control software 330 accesses a telephone number of the mobile phone 320. It should be understood that mobile phones are activated with a particular phone number in conjunction with subscribing to a call plan, which is the phone number the control software 330 reads from the mobile phone 320. In one example, the signaling 542 to obtain the phone number is performed using Bluetooth signaling.

In block 803, the control software 330 sends signaling 543 to the server 322. The signaling 543 can be sent over a local connection such as a USB, Bluetooth, or WiFi connection to be relayed by the mobile device 320 over a wireless telecommunications network. The content of the signaling 543 can be similar to the signal 244 described in more detail previously with respect to FIG. 4, but in addition, can provide the obtained phone number.

In block 804, the control software 332 compares the phone number included in the signaling 543 to the mapping 350. The mapping correlates each of a plurality of download directories A-B accessible via this particular head unit 321 to a particular phone number. For example, in the mapping a first phone number is correlated with the download directory A and a second phone number is correlated with the download directory B. The control software 332 selects one of the download directories A-B based on the comparison of the received telephone number to the mapping 350.

The software 332 then checks the selected one of the download directories A-B to determine if there are any applications currently stored in the selected directory. A scheme for intelligently selecting applications that are present in the download directories A-B will be discussed in detail later with reference to FIG. 9. For now, let it be assumed for the purposes of illustration that the download directories 339A and 339B currently include applications 340A (M-P) and 340B (Q-S), respectively, in addition to the head unit frontend configurations 369A and 369B.

As noted briefly in the previous paragraph, the download directories A-B include head unit frontend configurations A-B, respectively, in addition to the applications 340A and 340B. The configurations A-B can be stored as HTML code or other web code compatible with the web code renderer of the 399. Depending on which one of the head unit frontend configurations A-B is downloaded to the head unit 321, a display 380 of the head unit 321 will display a different graphical user interface. Each of the different web code files 369A and 369B will produce a different graphical user interface when displayed using the display 380 and the renderer 399. For example, each graphical user interface could have its own user customized settings such as a particular wallpaper selected by a user. A scheme for generating the different head unit frontend configurations A-B will be discussed in detail later with reference to FIG. 9.

In block 805, the software 332 generates and sends signaling to cause the IP gateway software 331 on the mobile phone 320 to operate as an IP gateway for forwarding applications to the head unit 321 similar to the scheme described in FIG. 4. In one example, similar to FIG. 4, such signaling includes communications to dynamically load the mobile phone 320 with the software 331 to cause the software 331 to operate thereon for the download to vehicle. This signaling may not take place if the mobile phone 320 is already loaded with the software 331 and ready for IP gateway operation. In other examples, the signaling 345 could originate from the control software 330 on the head unit 321 after the connection 540 is established.

In block 806, the software 332 generates and sends IP packets 545 to download the data from the selected one of the directories onto the vehicle, e.g. either applications M-P and configuration A or applications Q-S and configuration B. The IP packets 545 are received by the mobile phone 320 and forwarded by operation of the software 331 to the head unit 321. It should be understood that in this particular illustration the IP packets 545 include both applications and a configuration for the graphical user interface, but in other scenarios the IP packets 545 might contain either an application or a configuration. Also, it should be apparent that, if there are no applications currently in the selected download directory and there have been no changes to the configurations stored in the download directory since a previous download, then the IP packets 545 may not be sent.

In block 807, the software 330 receives the IP packets 545 and installs the applications included therein on the vehicle (installation can be on components of the head unit 321 or other vehicle components). The software 330 also processes the configuration from the IP packets 545 using the web code renderer 399 to generate a particular graphical user interface based on the detected phone number.

Thereafter, the graphical user interface output via the display 380 will correspond to one of the configurations A-B stored in the selected download directory. A user of the vehicle can operate the installed applications M-P or Q-S using the head unit 321 as an interface.

It should be understood that the software 330 and 332 can operate according to any of the principles described in FIGS. 1-3. For example, the software 330 and 332 can regulate utilization of the I/O resources of the head unit 321 by the active application(s) according to current vehicle status. As another example, in systems where applications are installed on both the vehicle and a mobile device, the software 330 and 332 can include all applications that utilize the vehicle interface in an application ranking/priority table similar to the table 13 (FIG. 1).

In the example described above, the control software 330 accesses a phone number of the mobile phone 320 to uniquely identify the mobile phone 320 from other mobile phones. In other examples, control software on the head unit 321 can access a different value on a communicatively coupled mobile phone to uniquely identify the mobile phone from other mobile phones. Other examples of values can include, but are not limited to, a physical address of the mobile phone. In such other examples, it should be apparent that such values are used in the mapping, e.g. if the other values are physical addresses then the mapping includes physical addresses correlated to download directories.

In the example described above, the control software 330 sends the accessed unique identifier (phone number in this example) to the server 322. In other examples, the mapping 350 can be stored on the vehicle. In such a case, the control software 330 identifies a particular download directory listed in the mapping according to the comparison and sends an identifier specifying the particular download to the server 322. The server 322 may then respond with IP packets 545 sending data from the identified download directory.

Figure 9:
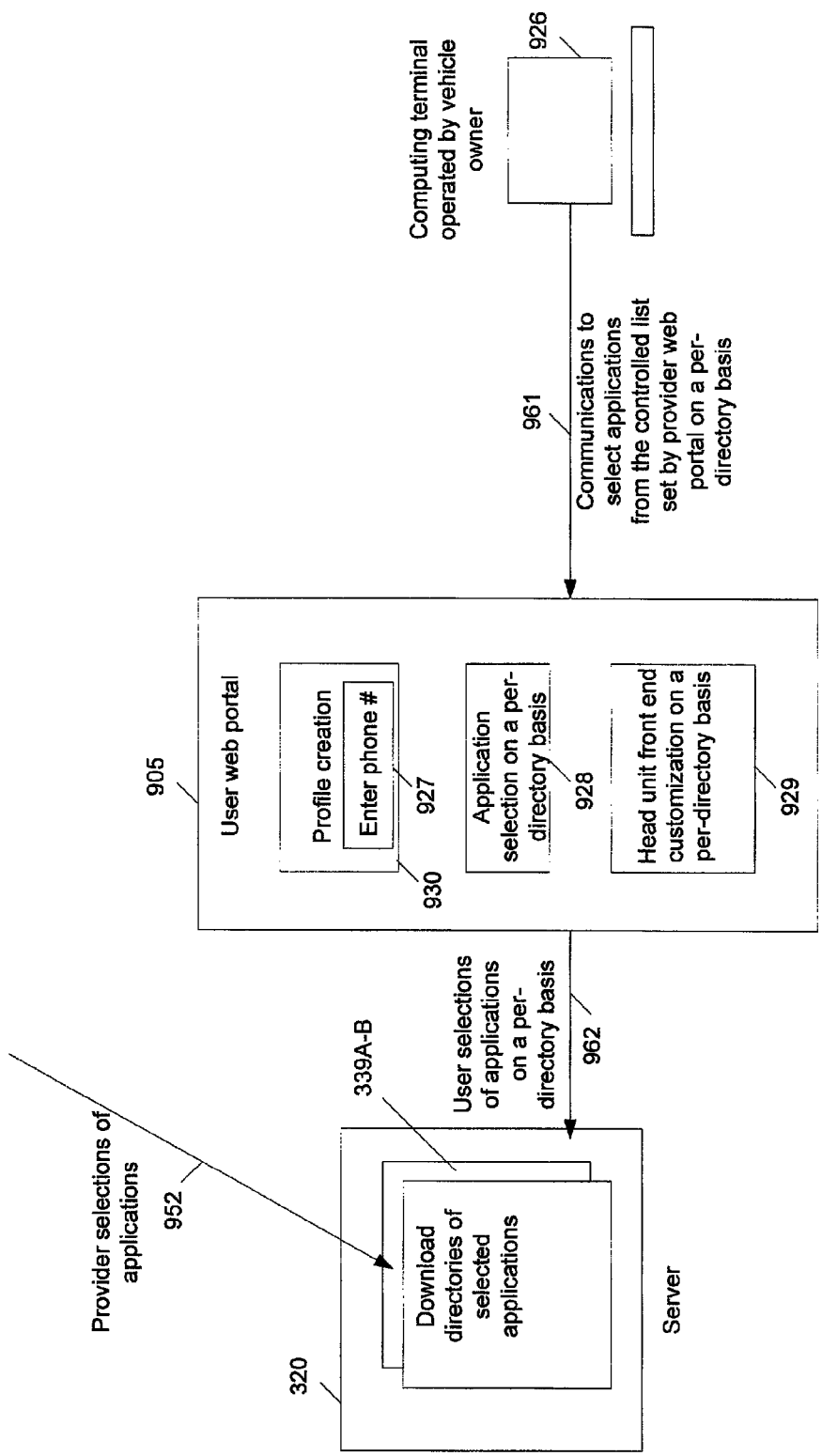
FIG. 9 illustrates more detail of the system shown in FIGS. 7-8.

FIG. 9 illustrates more detail of the system shown in FIGS. 7-8.

It was previously explained that the server 322 includes a plurality of download directories 339A-B of applications waiting to be downloaded. FIG. 9 illustrates the user web portal 905 that can be involved in creating the download directories 339A-B and selection of the applications on a per-directory basis and describes an example use of this web portal 905.

A vehicle user can create a plurality of profiles corresponding to the vehicle using the profile creation portion 930 of the user web portal 905. A profile can be created for each person that may use the vehicle. A field 927 requests a unique phone number or other unique identifier of a mobile phone respectively corresponding to each person. A name of each person or other information for each person may be gathered with the phone number(s). After or during profile creation, server 322 creates a download directory for each profile and updates the mapping 350 for each number/directory combination. In some examples, the portion 930 can be configured to allow a user to rank the created profiles so that, if the head unit can be coupled to more than one of the mobile devices simultaneously (it can depend on the connection protocol whether this is possible), a higher ranked one of the corresponding profiles will be used.

During or after profile creation the web portal 905 can be operated to select applications to be included in the download directories 339A-B using a computing terminal 926, for example using any internet accessible computing device such as the mobile device or a desktop computer. The computing terminal 926 accesses the application selection portion 928 of the user web portal 905 (which is hosted by a web server operated by the provider in one example) to view the controlled list of applications that can be installed on the vehicle. The user can then send communications 961 to select applications from the controlled list that the user would like installed on his vehicle on a per-directory basis. These selections 962 are respectively fed into the download directories 339A-B on a per-directory basis.

The user web portal 905 can also be configured to allow a user to remove particular applications from the download directories 339A-B, e.g. the user may desire to remove one of the provider selected applications 952 added to the download directory 339A or 339B via the provider on a per-directory basis. Removal can be by deletion of an application already sent to the download directory 339A or 339B, or by indicating that a particular application is not desired before such application is ever added to the download directory 339A or 339B.

The user web portal 905 can also include a head unit frontend configuration customization portion 928. This portion 928 allows new configurations 369A-B to be added to the download directories 339A-B, with each person's configuration customized according to their requests. For example, a first wallpaper background can be added to the download directory 339A and a second different wallpaper background can be added to the download directory 339B. Other customizations can include customized graphical interface buttons, customized graphical user interface layout, custom images, etc.

According to the above, applications can be accumulated into the per-vehicle download directories 339A-B on a per-directory basis. Upon the head unit coupling to a particular one of the mobile devices, data from a corresponding one of the download directories 339A-B can be downloaded and installed onto the vehicle to provide a customized application set and a customized user interface.

It should be understood that an interface similar to that of the web portal 905 can be displayed on the head unit of the vehicle. The user could then make selections from such interface for selecting applications from the controlled list. The selected applications could be downloaded immediately to the vehicle instead of being put in the download directory when the selections are made from the interface.

Figure 10:
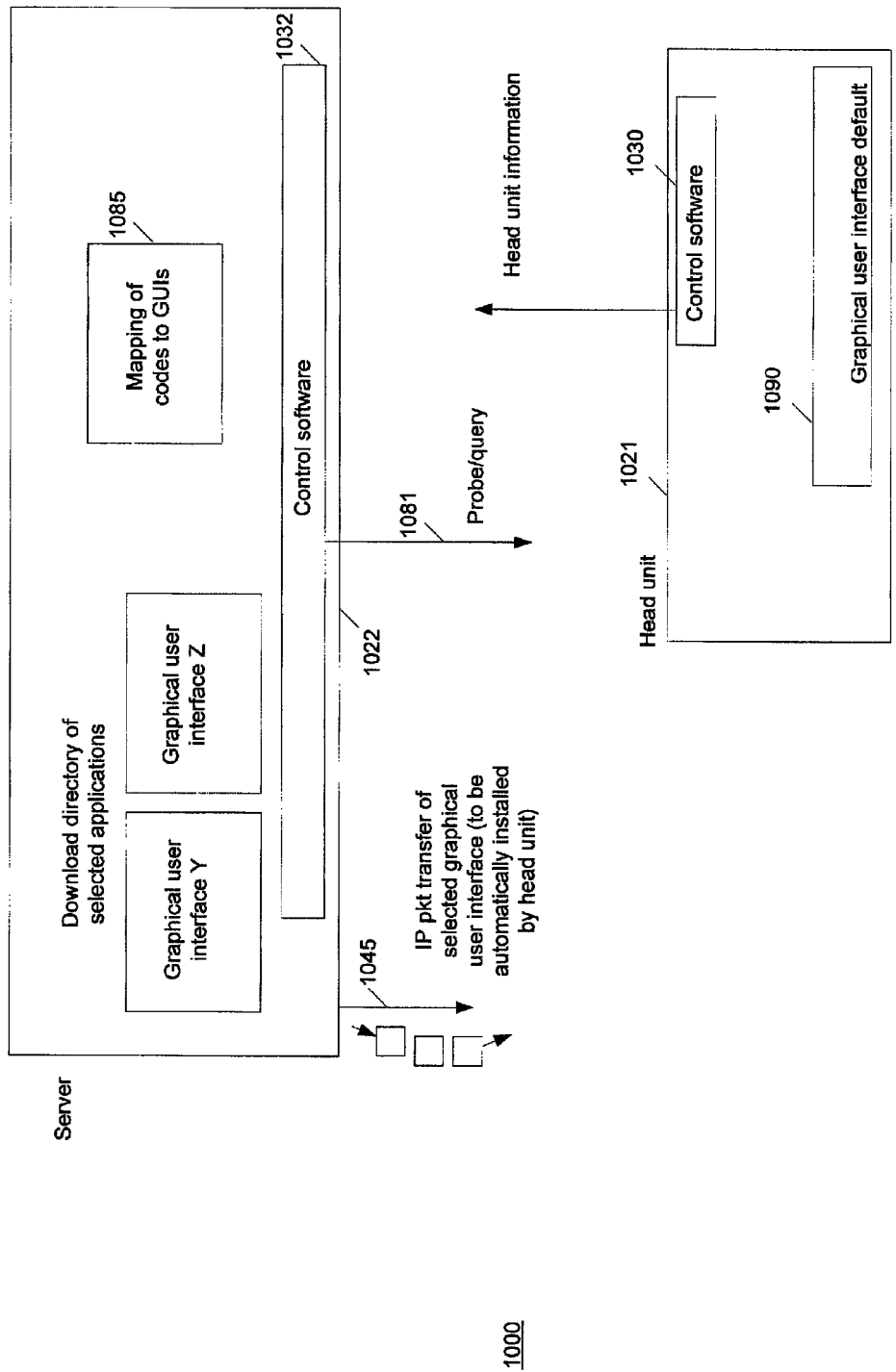
FIG. 10 illustrates a system to select a head unit graphical interface according to a configuration of the head unit.

FIG. 10 illustrates a system to select a head unit graphical interface according to a configuration of the head unit.

The system 1000 includes a server 1022 and a head unit 1021 that can include components similar to any of the previously described servers and head units. It should be appreciated that the server 1022 and the head unit 1021 communicate using a mobile device (not shown) that is coupled to the head unit 1021. The head unit 1021 includes control software 1030 and the server 1022 includes control software 1032.

The software 1032 identifies a configuration of the head unit 1021, for example, by probing 1081 the head unit 1021 to collect information. The software 1030 responds 1082 with information identifying the configuration of the head unit 1021. The response 1082 can include at least one of the following: a make/model/year of the vehicle, a predefined code, or an ad hoc listing of the configuration of the head unit 1021 (such as color/monochrome display, native resolution, etc.)

The software 1032 then selects from a plurality of graphical user interfaces based on the head unit information 1082. For example, if the head unit information 1082 includes a predefined code, the software 1032 can compare the code to a stored mapping 1085 of codes to graphical user interfaces Y-Z. The selected graphical user interface corresponds to a particular configuration of the head unit 1021 as reported by the information 1082. For example, if the head unit 1021 has a monochrome display, the selected Graphical User Interface (GUI) may be interface Y, whereas if the head unit 1021 has a color display, the selected GUI may be interface Z. Or, perhaps if the head unit 1021 has a native resolution of a first value, the selected GUI may be interface Y, whereas if the head unit 1021 has a native resolution of a second value, the selected GUI may be interface Z. If the make/model/year of the car indicates an interior of a first design, say a luxury motif, the selected GUI may be interface Y, whereas if the make/model/year of the car indicates an interior of a second design, say a sporty motif, the selected GUI may be interface Z.

Once a graphical user interface has been selected, the software 1032 conducts an IP packet transfer 1045 of the selected one of the graphical user interfaces Y-Z. It should be understood that the IP packet transfer 1045 may utilize the previously-described IP gateway software of the mobile phone (not shown). The software 1030 automatically installs the received graphical user interface. The selected graphical user interface can replace a default graphical user inference 1090 or previously downloaded graphical user interface residing on the head unit 1021 prior to the transfer 1045.

It should be understood that the previously described frontend configurations can be applied to the selected and installed GUI. For example, a selected GUI can be installed on the head unit 1021, and then further modified in appearance based on a customized frontend selection according to a telephone number of the mobile device currently coupled to the head unit 1021.

Figure 11:
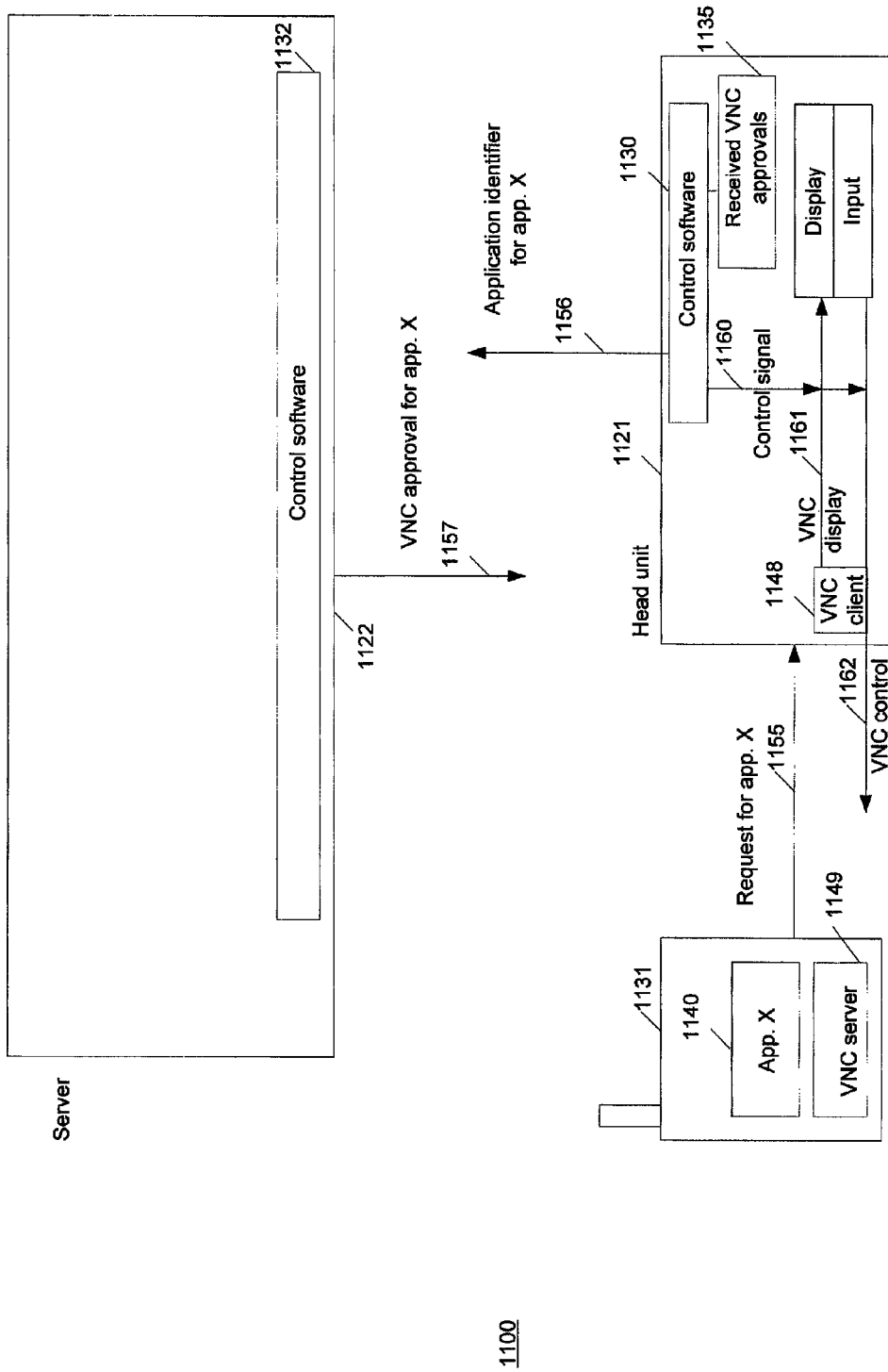
FIG. 11 illustrates a system to generate and send remote computing approvals to the head unit.

FIG. 11 illustrates a system to generate and send remote computing approvals to the head unit.

The system 1100 includes a server 1122 and a head unit 1121 that can include components similar to any of the previously described servers and head units. It should be appreciated that the server 1122 and the head unit 1121 communicate using a mobile device 1131. The head unit 1121 includes control software 1130 and the server 1122 includes control software 1132.

The head unit 1121 includes a remote desktop viewing program such as a Virtual Network Computing (VNC®) client 1148 to connect to the VNC server 1149 running on the mobile device 1131. By way of background, a VNC client and server communicate to display the server's desktop or other current view on the client's display. The human interfaces device(s) directly connected to the client, e.g. keyboard, mouse, etc., can then be used in conjunction with the displayed image to remotely control the computing device running the VNC server. If an application is running in full screen mode on the computing device with the VNC server, then the computing device with the VNC server controls that application (rather than the entire desktop).

The control software 1130 receives a request 1155 from the mobile device 1131 specifying a particular application X (1140). The control software 1130 identifies the application identifier corresponding to the request 1155 either by extracting the identifier itself from the request 1155 or using a lookup based on information gleaned from the request or from any communication with the mobile device 1131. The control software 1130 sends the communication 1156 containing the application identifier.

The control software 1132 compares the application identifier to an internal table and generates a VNC approval 1157 for the application X. The VNC approval 1157 specifies the particular conditions under which VNC is approved in conjunction for this application X. For example, if the application X is a navigation application, the approval 1157 might specify that VNC is approved when the vehicle is stopped or moving. In contrast, if the application X is a media creation application, the approval 1157 might specify that VNC is approved only when the vehicle is stopped.

The VNC approval 1157 can also specify different approvals based on whether the application is currently running in full screen mode or windowed mode. For example, the navigation application might be approved when the vehicle is moving, but only as long as the navigation application is running on the mobile device 1131 in full screen mode. This will prevent VNC functionality immediately if the user switches the navigation application into windowed mode while the vehicle is moving.

The VNC approval 1157 can also specify telephone numbers. For example, VNC can be permitted when the mobile device 1131 is running a media player application, but only if the mobile device has a particular telephone number (this can be used as a form of parental control).

The control software 1130 stores the received VNC approval 1157 in a database 1135 of VNC approvals. The control software 1130 continuously monitors conditions based on the VNC approvals stored in the database 1135 to generate the control signal 1160. The control signal 1160 controls whether a view 1161 of the mobile device 1131 can be currently displayed on a display of the head unit 1121 by the VNC client 1148. The control signal 1160 also controls whether inputs made using an input interface of the head unit 1121 will be sent 1162 to the VNC server 1149.

FIG. 12 illustrates a system to push graphical user interface updates to the head unit in response to the mobile device generating a request for a new application or the user web portal selecting a new application.

The system 1200 includes a server 1222 and a head unit 1221 that can include components similar to any of the previously described servers and head units. It should be appreciated that the server 1222 and the head unit 1221 communicate using a mobile device 1231.

The server 1222 can receive an indication of a new application to be used in the system 1200 in at least two different forms (the term new application refers to an application that has not previously been downloaded to the head unit 1221 and/or utilized the head unit 1221 as an extended interface). In one form, the mobile device 1231 sends an indication of a new application X (1240) to utilize the head unit 1221 as an extended interface. More specifically, this indication is an approval request 1271 generated and sent by the control software 1230 in response to receiving a request 1270 from the mobile device 1231.

Another way the server 1222 can receive an indication of a new application is from control over the user web portal 1205. The user web portal 1205 is similar to the previously described web portals. Using an application selection tool 1228, a user can use any remote computer to select applications to be included in a corresponding download directory (not shown) for installation on the head unit. Thus, a received selection 1274 including a new application is another form of indication of a new application to be used in the system 1200.

In response to detecting such an indication, the control software 1232 determines whether to transmit an IP packet transfer 1245 including a graphical user interface update for the new application X. It should be apparent that no such IP packet transfer will be sent if the new application X is not included in the previously discussed controlled list of applications (FIG. 6). In one example, the graphical user interface update modifies a previously selected and installed graphical user interface (FIG. 10) to add an icon for accessing the new application X. In another example, the graphical user interface update includes any other form of update to a previously selected and installed graphical user interface for operating new application X. The control software 1230 automatically installs the update in response to the sending of the request 1270 and/or the selections 1274. It should be apparent that the transfer 1245 can be included with a download of the application itself in the case that the download is waiting for vehicle power up in a download directory.

Figure 13A:
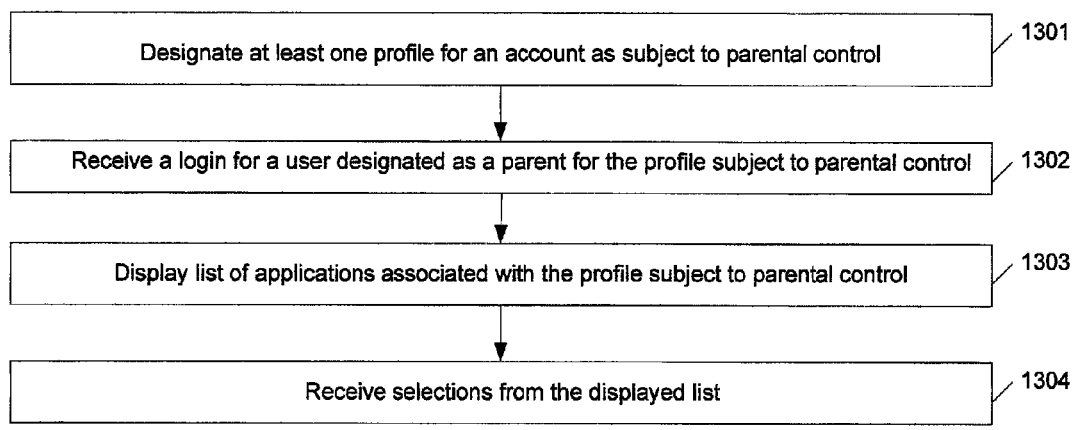
FIG. 13A illustrates a flow chart showing pre-operation of a parental control scheme.

FIG. 13A illustrates a flow chart showing pre-operation of a parental control scheme.

In block 1301, the server designates at least one profile as being subject to parental control. This profile can be selected by the account holding, for example, by marking a selection using the web portal.

In block 1302, the server receives a login for a user designated as a parent (typically the account holder) for the profile subject to parental control. In block 1303, the server causes a list of applications associated with the profile subject to parental control to be displayed using the web portal.

In block 1304, after displaying the list, the server receives selections from the displayed list. The server may store these selections in the profile that is subject to parental control. The selections can include applications from the list and/or more detailed information in the case of a conditional approval (a conditional approval is discussed later in more detail).

Figure 13B:
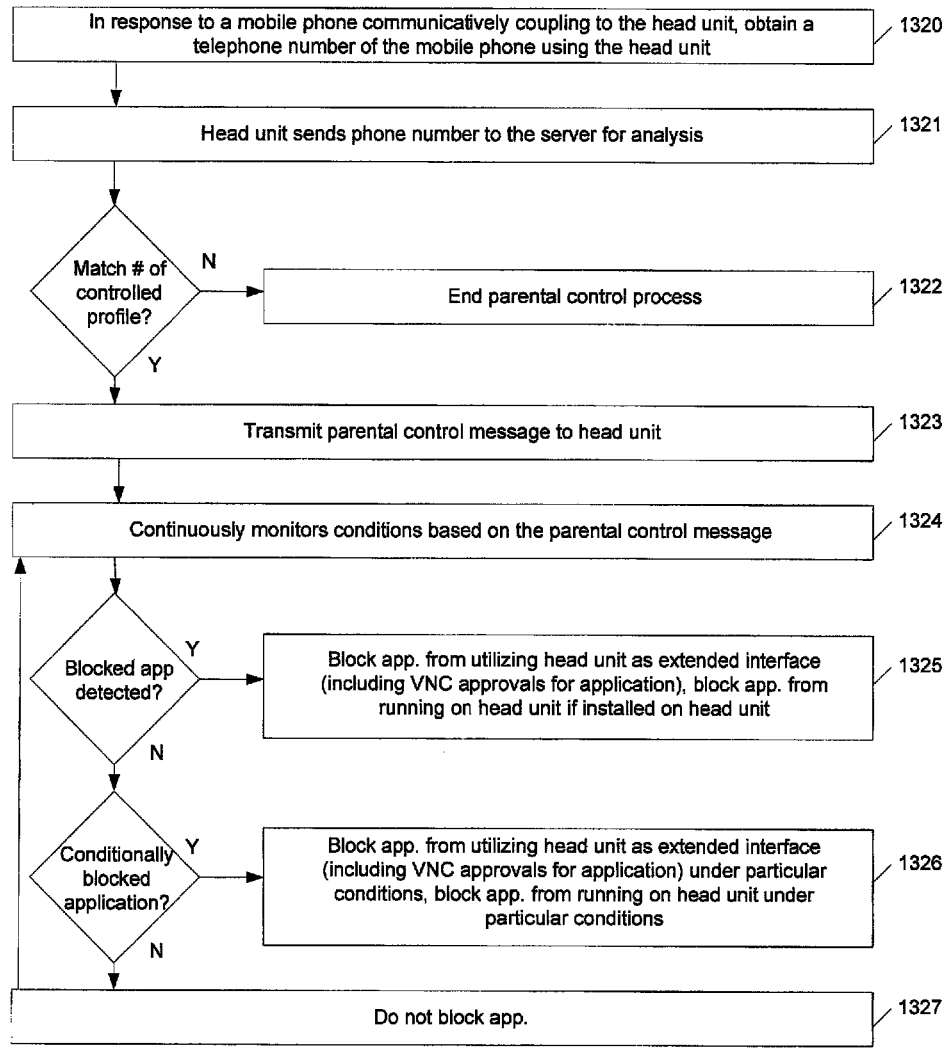
FIG. 13B illustrates a flow chart showing operation of the parental control scheme.

FIG. 13B illustrates a flow chart showing operation of the parental control scheme.

In block 1320, in response to a mobile phone communicatively coupling with the head unit, the head unit obtains a telephone number of the mobile phone to be used to communicate with the server. In block 1321, the head unit sends the phone number to the server for analysis. If the obtained phone number does not match a profile designated as subject to parental control, then the parental control process completes in block 1322.

Otherwise, if the obtained phone number does correspond to the profile subject to parental control, then in block 1323 the server executes parental control. In one example, such execution includes blocks 1323-1327, similar to the VNC approval process, discussed in the next paragraph.

In block 1323, the server transmits a parental control message to the head unit. In block 1324, the head unit continuously monitors conditions based on the parental control message. In block 1325, the head unit blocks a particular application from using the head unit as an extended interface and/or blocks a particular application installed on the head unit from running. For example, the head unit might receive an indication that the particular mobile phone has received a telephone call, but then block the use of the head unit as an extended interface for the telephone call. Or, the head unit might block an attempt to run a media player application on the head unit in another example. The continuous monitoring may be facilitated by a database on the head unit storing received parental control messages.

In block 1326, the head unit conditionally blocks a particular application from using the head unit as an extended interface and/or running directly on the head unit. For example, the head unit might receive an indication that the particular mobile phone has received a telephone call, but then block the use of the head unit as an extended interface conditionally based on a value of a caller ID field on the incoming call. More specifically, the parental control message might designate certain telephone numbers as exceptions to preventing the head unit from providing an extended interface for the telephone. The head unit obtains the caller ID value from the mobile phone and blocks the mobile phone from utilizing an interface of the head unit conditionally. In another example, the head unit might block an application conditionally based on a condition of the vehicle, e.g. the head unit blocks the mobile phone from utilizing an interface of the head unit only if the vehicle is currently moving.

In block 1327, the head unit does not block the particular application if the application is permitted according to the parental control message. In this case, the head unit allows the application to operate according to approval by the server, e.g. according to whether the application is on the controlled list (FIG. 6).

It should be apparent that, in other examples, a system can enforce a parental control scheme using different processes than those specifically described above. For example, in another example, the processes of blocks 1323-1327 are not used. Instead, the head unit continuously reports conditions and application requests to the server, which dynamically withdraws a current approval according to the parental control settings. The server then controls the head unit to block a current disapproved application.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical navigation device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A computer-implemented method for remotely controlling operation of a user application program executable in a motor vehicle, the method comprising the steps of:
   providing a server computer located remotely from a motor vehicle and having access to wireless communications for exchanging information with the motor vehicle;
   storing a digital configuration file in a datastore accessible to the server, the configuration file including parameters for remotely controlling access to user interface resources of a head unit of the motor vehicle;
   wherein the stored parameters are each specific to a particular user application program executable in the motor vehicle;
   receiving at the server a wirelessly transmitted request message from the motor vehicle, the request message including an identifier of the motor vehicle, and data for identifying a user application program executable in the motor vehicle;
   identifying a user application program based on the data in the request message;
   accessing the stored configuration file parameters to select parameters specific to the identified user application program; and
   wirelessly transmitting a control message to the motor vehicle in response to the request message, the control message indicating, for the identified user application program, which user interface resources of the head unit of the motor vehicle are permitted, or conversely are not permitted, to be utilized by the user application program, based on the selected parameters stored in the configuration file;

in the motor vehicle, establishing a communicative coupling between a user's mobile wireless device and the motor vehicle head unit; and in the motor vehicle head unit, receiving data via the communicative coupling for identifying user application programs stored on the user's wireless device; and wherein the data sent to the server in the request message for identifying a user application program includes data identifying at least one of the application programs stored on the user's wireless device, so that the control message indicates which user interface resources of the head unit of the motor vehicle are permitted, or conversely are not permitted, to be utilized by the identified user application program stored on the user's wireless device.

2. The method of claim 1, wherein the user application program executes on the user's wireless device located in the motor vehicle and the communicative coupling to the head unit comprises a cable or short-range wireless link.

3. The method of claim 1, wherein the user interface resources of the head unit subject to control via the control message include an audio output and a video display screen.

4. A computer-implemented method for remotely controlling operation of a user application program executable in a motor vehicle, the method comprising the steps of:

providing a server computer located remotely from a motor vehicle and having access to wireless communications for exchanging information with the motor vehicle;

storing a digital configuration file in a datastore accessible to the server, the configuration file including parameters for remotely controlling access to user interface resources of a head unit of the motor vehicle;

wherein the stored parameters are each specific to a particular user application program executable in the motor vehicle;

receiving at the server a wirelessly transmitted request message from the motor vehicle, the request message including an identifier of the motor vehicle, and data for identifying a user application program executable in the motor vehicle;

identifying a user application program based on the data in the request message, accessing the stored configuration file parameters to select parameters specific to the identified user application program; and wirelessly transmitting a control message to the motor vehicle in response to the request message, the control message indicating, for the identified user application program, which user interface resources of the head unit of the motor vehicle are permitted, or conversely are not permitted, to be utilized by the user application program, based on the selected parameters stored in the configuration file, wherein:

the head unit includes a display screen and the an identifier of the head unit comprises one or more of a make/model/year of the vehicle a predefined head unit identification code, and a listing of at least one parameter of the head unit display screen; and further comprising the steps of:

in the server, selecting a GUI based on information received in the request message; and in the control message, instructing the head unit to install and use the selected GUI;

and further comprising: modifying the selected GUI in appearance based on a customized frontend, wherein the customized frontend is selected based on a telephone number of a mobile device currently coupled to the motor vehicle head unit, or information provided by the user through the head unit.

\* \* \* \* \*